(No Model.)

J. A. WOODWORTH.
HAMMOCK SUPPORT.

No. 332,369. Patented Dec. 15, 1885.

Witnesses:
J. B. Halpenny.
John S. Thompson

Inventor:
James A. Woodworth
By Gridley & Fletcher
Att'ys.

UNITED STATES PATENT OFFICE.

JAMES A. WOODWORTH, OF HIGHLAND PARK, ILLINOIS.

HAMMOCK-SUPPORT.

SPECIFICATION forming part of Letters Patent No. 332,369, dated December 15, 1885.

Application filed August 25, 1885. Serial No. 175,261. (No model.)

*To all whom it may concern:*

Be it known that I, JAMES A. WOODWORTH, of Highland Park, in the county of Cook and State of Illinois, have invented a new, useful, and Improved Hammock-Support, of which the following is a description, reference being had to the accompanying drawings, in which—

Figure 1:
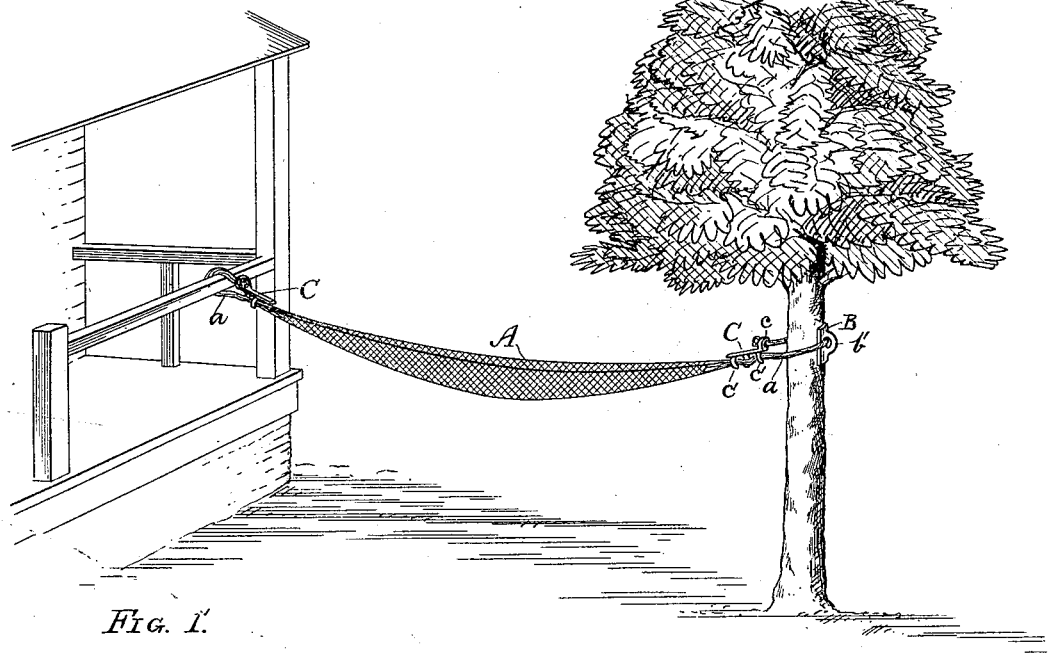
Figure 2:
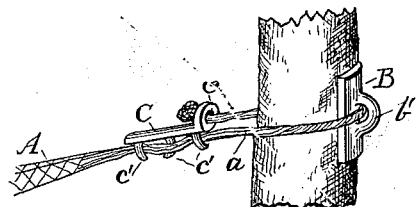
Figure 4:
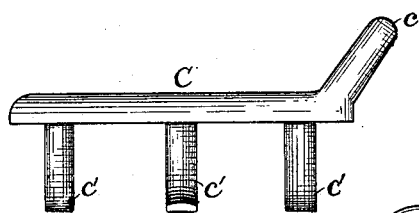
Figure 5:
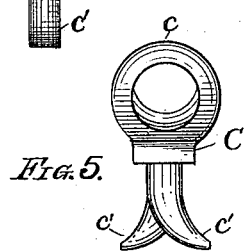
Figure 6:
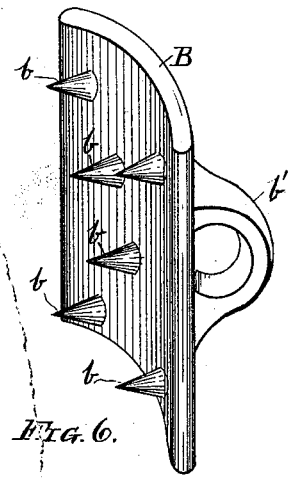
Figure 3:
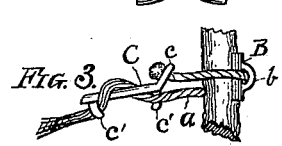

Figure 1 is a view of a hammock, one end of which is attached to a veranda-railing and the other to a tree, to which said support is applied. Fig. 2 is an enlarged detail view showing a portion of a tree to which said support is applied in like manner. Fig. 3 is a detail view showing a modified form of clutch or detachable grip to be applied to the end of the rope and used for fastening the same. Fig. 4 is a side view of the preferable form of clutch to be used in connection with said support, the application of which is shown in Figs. 1 and 2. Fig. 5 is an end view of said grip, and Fig. 6 a detached perspective view of said support.

Like letters of reference indicate like parts in the respective figures.

The object of my invention is to provide a cheap and simple device capable of being permanently attached to the supporting-ropes of hammocks, for the purpose of preventing said ropes from slipping downwardly when tied to trees or smooth posts. A further object is to provide a clutch or grip to be used in connection therewith, and which may be readily attached or detached in putting up or taking down the hammock, thus avoiding the tying and untying of knots and the inconvenience resulting therefrom, as well as furnishing a more secure and reliable fastening, all of which is hereinafter more particularly described, and definitely pointed out in the claims.

In the drawings, A represents a hammock, to the respective ends of which are attached the usual supporting-ropes, *a a.*

B (better shown in Fig. 6) represents a clamp or "crab," which is preferably formed from a single piece of metal cast in malleable iron, and consists of a plate or frame curved by preference substantially as shown, upon one side of which is provided any desired number of sharp projecting bosses or spurs, *b*, while upon the opposite or convex side is rigidly attached an eye, *b'*, which should be large enough for the reception of a rope *a*, such as is ordinarily employed for the support of hammocks. Upon inserting the ropes *a a* in the eyes *b'* of the clamps B B, one of which is applied to each of said ropes, which should move loosely in said eyes, said clamps may be utilized in suspending the hammock. A knot may be tied in the ends of said ropes, respectively, to retain said clamps permanently thereon and prevent them from being lost when the hammock is not in use; or the same object is preferably accomplished by attaching clutches or grips C C to the ends of said ropes, as clearly shown in the drawings. Each grip or clutch C may consist of a single straight bar, having an eye, *c*, to which the end of the rope *a* may be attached, as shown in Fig. 1, and two or more projecting fingers or hooks, *c' c' c'*. I prefer to use three of said fingers, as shown in Figs. 2, 4, and 5, in which event those upon the ends should be slightly curved laterally in the same direction, while the other should be bent oppositely thereto. In using said clutch the rope *a* should be intertwined between the fingers *c'*, as shown in Fig. 2. Where two fingers only are used, they should be placed upon the ends of the bar C and bent laterally in opposite directions, as shown in Fig. 3, in which event the rope *a* should be hooked against one of said fingers and carried around the arm C and hooked against the other finger *c'*, as shown in said last-named figure.

In using said supporting device I place the clamp B against the tree or post to which one end of the hammock is to be fastened, and at the desired height, the spurs *b'* penetrating sufficiently with slight pressure to prevent slipping. The rope *a*, which is passed through the eye *b'*, as stated, is then wound one or more times around said tree and the end attached to the suspended portion between said hammock and tree by means of the clutch C, a hook or anchor of any well-known form, or it may be tied as usual; but I prefer the clutch described. When both ends are thus secured, and weight is applied to the hammock, the spurs *b* become embedded in the wood and sustain the ropes *a a* securely and at the desired height, while the greater the tension upon the rope *a* the more firmly the clutch or grip C becomes locked thereto. On the other hand, as soon as the ropes *a a* are slackened the clutches C C may be detached and adjusted in any position desired to properly adjust the hammock.

The advantages of said device are obvious, as it enables any person, however unskilled, to put up or take down a hammock, and when in place the same is necessarily secure, and the danger of accident, which so often results from the unksillful tying of hammock-ropes, is obviated.

I am aware that a frame provided with a windlass, ratchet-wheel, and pawl has been used for tightening wire, said frame being provided with spurs to retain the same in position upon a post, and I make no claim to such construction.

What I do claim, and desire to secure by Letters Patent, is—

As a new article of manufacture, a hammock-support consisting of the plate B, provided with the spurs $b$ and eye $b'$, substantially as shown and described.

JAMES A. WOODWORTH.

Witnesses:
D. H. FLETCHER,
J. B. HALPENNY.